United States Patent
Yang et al.

(10) Patent No.: US 9,213,392 B2
(45) Date of Patent: Dec. 15, 2015

(54) SYSTEMS AND METHODS FOR GOVERNING POWER USAGE IN AN ITERATIVE DECODING SYSTEM

(75) Inventors: Shaohua Yang, Santa Clara, CA (US); Changyou Xu, Fremont, CA (US); Fan Zhang, Milpitas, CA (US); Yang Han, Sunnyvale, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 674 days.

(21) Appl. No.: 13/227,557

(22) Filed: Sep. 8, 2011

(65) Prior Publication Data

US 2013/0067247 A1    Mar. 14, 2013

(51) Int. Cl.
 *G06F 1/32*    (2006.01)

(52) U.S. Cl.
 CPC ............ *G06F 1/3221* (2013.01); *G06F 1/3268* (2013.01); *Y02B 60/1246* (2013.01)

(58) Field of Classification Search
 None
 See application file for complete search history.

(56) References Cited

U.S. PATENT DOCUMENTS

| | | |
|---|---|---|
| 5,544,138 A | 8/1996 | Bajorek et al. |
| 5,715,467 A | 2/1998 | Jirgal |
| 6,710,959 B1 * | 3/2004 | Iroaga ............................. 360/67 |
| 6,973,583 B2 | 12/2005 | Kobori |
| 6,983,389 B1 | 1/2006 | Filippo |
| 7,055,117 B2 | 5/2006 | Yee |
| 7,203,857 B2 | 4/2007 | Hamilton |
| 2004/0255177 A1 | 12/2004 | Hamilton |
| 2005/0163237 A1 | 7/2005 | Katanaya |
| 2006/0107077 A1 | 5/2006 | Roth et al. |
| 2006/0123259 A1 | 6/2006 | Yokota et al. |
| 2007/0220293 A1 * | 9/2007 | Takase ........................ 713/320 |
| 2008/0077818 A1 | 3/2008 | Rauschmayer |
| 2010/0010857 A1 * | 1/2010 | Fadell ............................. 705/8 |
| 2010/0205462 A1 | 8/2010 | Rauschmayer et al. |
| 2010/0218020 A1 | 8/2010 | Rauschmayer et al. |
| 2010/0257529 A1 * | 10/2010 | Wilkerson et al. ............ 718/102 |
| 2010/0268917 A1 | 10/2010 | Nation et al. |

FOREIGN PATENT DOCUMENTS

WO     WO 2004/023268        3/2004

OTHER PUBLICATIONS

U.S. Appl. No. 12/425,507, filed Apr. 17, 2009, Nation et al.
International Business Machines, "Adaptive Power Management for Mobile Hard Drives", white paper dated Apr. 1999. See www.almaden.ibm.com/almaden/mobile_hard_drives.html.

* cited by examiner

*Primary Examiner* — Paul Yanchus, III

(57) ABSTRACT

Various embodiments of the present invention provide systems and methods for data processing. As an example, a data processing circuit is disclosed that includes a data detector circuit, a data decoder circuit, and a gating circuit.

24 Claims, 6 Drawing Sheets

SYSTEMS AND METHODS FOR GOVERNING POWER USAGE IN AN ITERATIVE DECODING SYSTEM

BACKGROUND OF THE INVENTION

The present invention is related to systems and methods for data processing, and more particularly to systems and methods for governing power usage in a data processing system.

Data processing circuits often include a data detector circuit and a data decoder circuit. A data set is typically processed first through the data detector circuit with the results thereof being processed through the data decoder circuit. In some cases, the data set is passed through both the data detector circuit and the data decoder circuit many times before a data output is available. This processes of data decoding and data detection can consume significant amounts of power that at times may exceed the capability of an existing power supply. Exceeding the limits of the power supply may result in an under-voltage condition and a corresponding increase in error rates of the data processing circuit.

Hence, for at least the aforementioned reasons, there exists a need in the art for advanced systems and methods for data processing.

BRIEF SUMMARY OF THE INVENTION

The present invention is related to systems and methods for data processing, and more particularly to systems and methods for governing power usage in a data processing system.

Various embodiments of the present invention provide data processing circuits that include a data detector circuit, a data decoder circuit, and a gating circuit. The data detector circuit is operable to apply a data detection algorithm guided by a first decoded output to a first data set to yield a first detected output and to apply the data detection algorithm guided by a second decoded output to a second data set to yield a second detected output. The data decoder circuit is operable to apply a data decode algorithm to the first detected output to yield the first decoded output and to apply the data decode algorithm to the second detected output to yield the second decoded output. The gating circuit is operable to spread a power usage level by delaying at least one of: the start of applying the data detection algorithm to the first data set by the data detector circuit; and the start of applying the data decode algorithm to the first detected output by the data decoder circuit. The data decode algorithm may be, but is not limited to, a Reed Solomon data decode algorithm, or a low density parity check decode algorithm. The data detection algorithm may be, but is not limited to, a maximum a posteriori data detection algorithm, or a Viterbi algorithm data detector circuit.

In some instances of the aforementioned embodiments, once applying the data detection algorithm to the first data set by the data detector circuit begins, application of the data detection algorithm to the first data set continues to completion without delay by the gating circuit. In other instances of the aforementioned embodiments, once applying the data decode algorithm to the first detected output by the data decoder circuit begins, application of the data decode algorithm to the first detected output continues to completion without delay by the gating circuit.

In one or more instances of the aforementioned embodiments, the gating circuit is operable to assert a disable signal to the data detector circuit between application of the data detection algorithm to the first decoded output and application of the data detection algorithm to the second decoded output. In some instances of the aforementioned embodiments, the gating circuit is operable to assert a disable signal to the data decoder circuit between application of the data decode algorithm to the first detected output and application of the data decode algorithm to the second detected output. In various instances of the aforementioned embodiments, the gating circuit is operable to calculate an extended delay period between application of the data decode algorithm to the first detected output and application of the data decode algorithm to the second detected output based at least upon a first expected power usage corresponding to the data decoder circuit applying the data decode algorithm to the first detected output, a second expected power usage corresponding to the data decoder circuit applying the data decode algorithm to the second detected output, and an expected delay between application of the data decode algorithm to the first detected output and application of the data decode algorithm to the second detected output. In other instances of the aforementioned embodiments, the gating circuit is operable to calculate an extended delay period between application of the data detection algorithm to the first decoded output and application of the data detection algorithm to the second decoded output based at least upon a first expected power usage corresponding to the data detector circuit applying the data detection algorithm to the first decoded output, a second expected power usage corresponding to the data detector circuit applying the data detection algorithm to the second decoded output, and an expected delay between application of the data detection algorithm to the first decoded output and application of the data detection algorithm to the second decoded output. In yet other instances of the aforementioned embodiments, the gating circuit is operable to calculate an extended delay period between application of the data decode algorithm to the first detected output and application of the data decode algorithm to the second detected output based at least upon an expected delay between the data decoder circuit applying the data decode algorithm to the first detected output and the data decoder circuit applying the data decode algorithm to the second detected output. In further instances of the aforementioned embodiments, the gating circuit is operable to calculate an extended delay period between application of the data detection algorithm to the first decoded output and application of the data detection algorithm to the second decoded output based at least upon an expected delay between the data detector circuit applying the data detection algorithm to the first detected output and the data decoder circuit applying the data decode algorithm to the second detected output.

Other embodiments of the present invention provide methods for governing power usage in a data processing system. Such methods include: calculating an expected operational level; receiving a supportable operational level; calculating a delay between processing of a first data set and a second data set by a processing circuit in the data processing system that renders the expected operational level less than or equal to the supportable operational level; and enforcing the delay between the processing circuit operating on the first data set and the processing circuit operating on the second data set.

In some instances of the aforementioned embodiments, the processing circuit is a data detector circuit operable to apply a data detection algorithm to the first data set and to the second data set. The data detector circuit may be, but is not limited to, a maximum a posteriori data detection algorithm, or a Viterbi algorithm data detector circuit. In various instances of the aforementioned embodiments, once applying the data detection algorithm to the second data set by the data detector circuit begins, application of the data detection algorithm to the second data set continues to completion without delay by the gating circuit.

In some instances of the aforementioned embodiments, the processing circuit is a data decoder circuit operable to apply a data decode algorithm to the first data set and to the second data set. The data decoder circuit may be, but is not limited to, a Reed Solomon data decode algorithm, or a low density parity check decode algorithm. In various instances of the aforementioned embodiments, once applying the data decode algorithm to the second data set by the data decoder circuit begins, application of the data decode algorithm to the second data set continues to completion without delay by the gating circuit.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present invention is related to systems and methods for data processing, and more particularly to systems and methods for governing power usage in a data processing system.

In various data processing systems, the data detection circuit(s) apply a data detection algorithm to a received data set that completes within a reasonably well defined number of clock cycles, and the data decoder circuit(s) apply a data decode algorithm to output of the data detector circuit(s) that also completes within a reasonably well defined number of clock cycles. In some such cases, the capacitance of a voltage regulator supplying a data processing circuit allows for supporting full operation of both data detection circuit(s) and data decoding circuit(s) for a period of time that substantially exceeds the defined number of clock cycles required by the data decoder circuit(s) and/or data detector circuit(s). As used herein, the phrase "substantially exceeds the defined number of clock cycles" is used in its broadest sense to mean more clock cycles than required by a data detector circuit plus an expected delay between successive operative periods of the data detector circuit, or more clock cycles than required by a data decoder circuit plus an expected delay between successive operative periods of the data decoder circuit. In some embodiments of the present invention, power usage of a data processing circuit is done by modifying the amount of delay time between data detector circuit operation and/or data decoder operation without modifying the period over which a data set is processed by a data detector or data decoder circuit.

Figure 1:
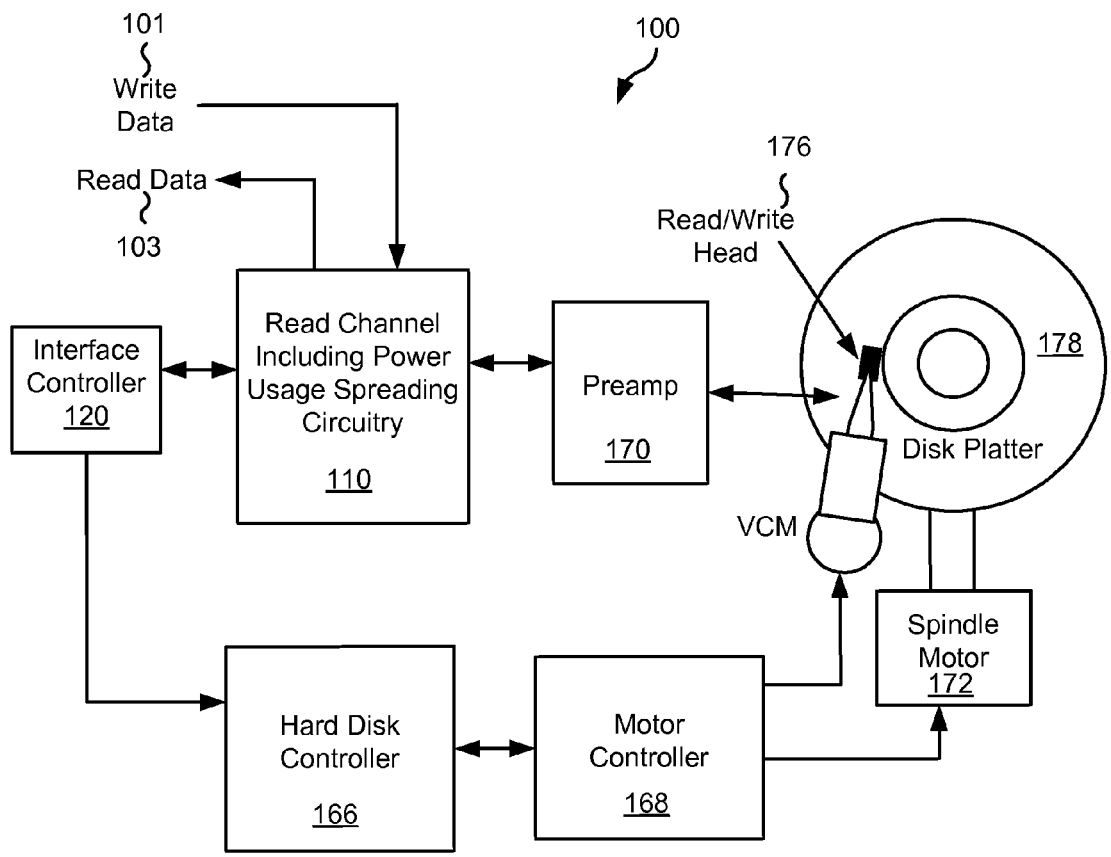
FIG. 1 shows a storage system including a read channel having power usage spreading circuitry in accordance with one or more embodiments of the present invention.

Turning to FIG. 1, a storage system 100 including a read channel circuit 110 having power usage spreading circuitry is shown in accordance with some embodiments of the present invention. Storage system 100 may be, for example, a hard disk drive. Storage system 100 also includes a preamplifier 170, an interface controller 120, a hard disk controller 166, a motor controller 168, a spindle motor 172, a disk platter 178, and a read/write head assembly 176. Interface controller 120 controls addressing and timing of data to/from disk platter 178. The data on disk platter 178 consists of groups of magnetic signals that may be detected by read/write head assembly 176 when the assembly is properly positioned over disk platter 178. In one embodiment, disk platter 178 includes magnetic signals recorded in accordance with either a longitudinal or a perpendicular recording scheme.

In a typical read operation, read/write head assembly 176 is accurately positioned by motor controller 168 over a desired data track on disk platter 178. Motor controller 168 both positions read/write head assembly 176 in relation to disk platter 178 and drives spindle motor 172 by moving read/write head assembly to the proper data track on disk platter 178 under the direction of hard disk controller 166. Spindle motor 172 spins disk platter 178 at a determined spin rate (RPMs). Once read/write head assembly 178 is positioned adjacent the proper data track, magnetic signals representing data on disk platter 178 are sensed by read/write head assembly 176 as disk platter 178 is rotated by spindle motor 172. The sensed magnetic signals are provided as a continuous, minute analog signal representative of the magnetic data on disk platter 178. This minute analog signal is transferred from read/write head assembly 176 to read channel circuit 110 via preamplifier 170. Preamplifier 170 is operable to amplify the minute analog signals accessed from disk platter 178. In turn, read channel circuit 110 decodes and digitizes the received analog signal to recreate the information originally written to disk platter 178. This data is provided as read data 103 to a receiving circuit. A write operation is substantially the opposite of the preceding read operation with write data 101 being provided to read channel circuit 110. This data is then encoded and written to disk platter 178.

During a read operation, data received from preamplifier circuit 170 is converted from an analog signal to a series of corresponding digital samples, and the digital samples are processed through a combination of at least one data detector circuit and at least one data decoder circuit. During this process, interim spacing between processing of codewords by a data detector circuit and/or a data decoder circuit may be modified to govern power usage by the data processing circuit. This interim spacing modification may be done using power usage spreading circuitry similar to that discussed below in relation to FIGS. 3-6 below, and/or operates similar to the method described below in relation to FIG. 7.

It should be noted that storage system 100 may be integrated into a larger storage system such as, for example, a RAID (redundant array of inexpensive disks or redundant array of independent disks) based storage system. It should also be noted that various functions or blocks of storage system 100 may be implemented in either software or firmware, while other functions or blocks are implemented in hardware.

Figure 2:
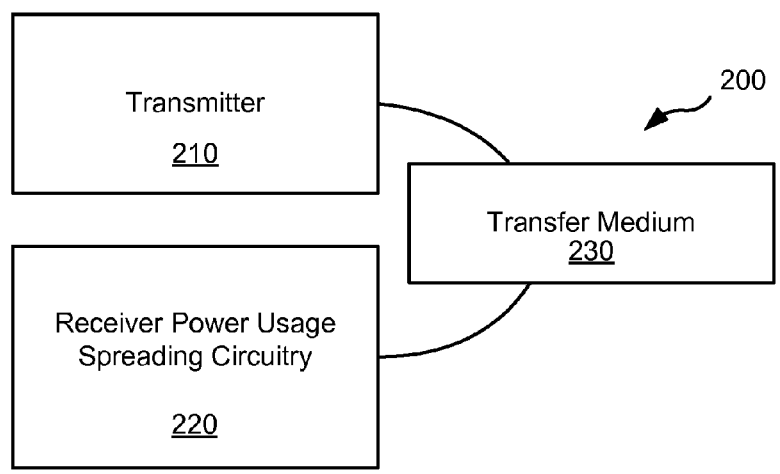
FIG. 2 shows a data transmission system including a receiver having power usage spreading circuitry in accordance with some embodiments of the present invention.

Turning to FIG. 2, a data transmission device 200 including a receiver 220 having power usage spreading circuitry is shown in accordance with some embodiments of the present invention. Data transmission system 200 includes a transmitter 210 that is operable to transmit encoded information via a transfer medium 230 as is known in the art. The encoded data is received from transfer medium 230 by receiver 220. Receiver 220 incorporates a data processing circuit that includes an anti-causal noise prediction circuit. While processing received data, an analog signal is converted to a series of corresponding digital samples, and the digital samples are equalized to yield an equalized output. During this process, interim spacing between processing of codewords by a data detector circuit and/or a data decoder circuit may be modified to govern power usage by the data processing circuit. This interim spacing modification may be done using power usage spreading circuitry similar to that discussed below in relation to FIGS. 3-6 below, and/or operates similar to the method described below in relation to FIG. 7.

Figure 3:
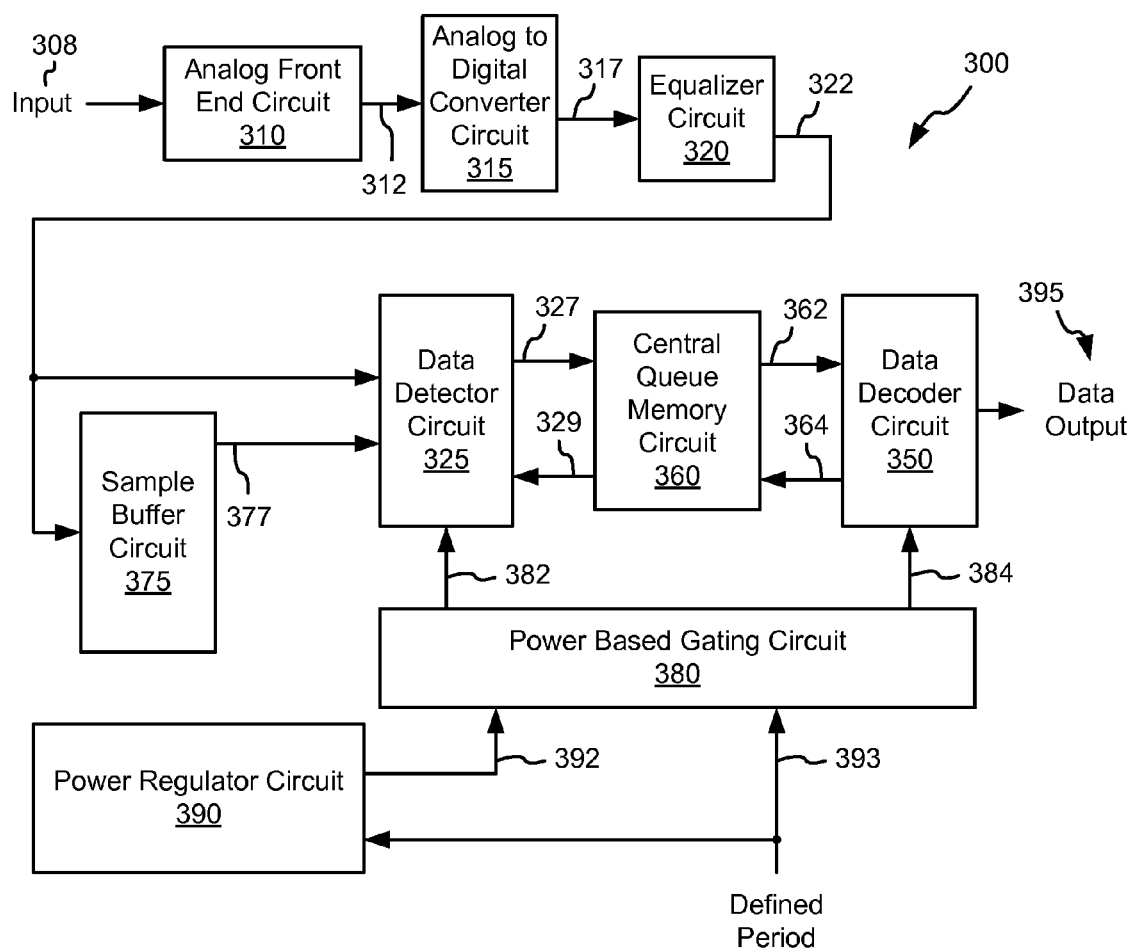
FIG. 3 depicts a data processing circuit having power usage spreading circuitry in accordance with some embodiments of the present invention.

Turning to FIG. 3, a data processing circuit 300 is shown that includes power usage spreading circuitry in accordance with some embodiments of the present invention. Data processing circuit 300 includes an analog front end circuit 310 that receives an analog signal 308. Analog front end circuit 310 processes analog signal 308 and provides a processed analog signal 312 to an analog to digital converter circuit 315. Analog front end circuit 310 may include, but is not limited to, an analog filter and an amplifier circuit as are known in the art. Based upon the disclosure provided herein, one of ordinary skill in the art will recognize a variety of circuitry that may be included as part of analog front end circuit 310. In some cases, analog signal 308 is derived from a read/write head assembly (not shown) that is disposed in relation to a storage medium (not shown). In other cases, analog signal 308 is derived from a receiver circuit (not shown) that is operable to receive a signal from a transmission medium (not shown). The transmission medium may be wired or wireless. Based upon the disclosure provided herein, one of ordinary skill in the art will recognize a variety of source from which analog input 308 may be derived.

Analog to digital converter circuit 315 converts processed analog signal 312 into a corresponding series of digital samples 317. Analog to digital converter circuit 315 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 317 are provided to an equalizer circuit 320. Equalizer circuit 320 applies an equalization algorithm to digital samples 317 to yield an equalized output 322. In some embodiments of the present invention, equalizer circuit 320 is a digital finite impulse response filter circuit as are known in the art.

Equalized output 322 is provided to both a data detector circuit 325 and to a sample buffer circuit 375. Sample buffer circuit 375 stores equalized output 322 as buffered data 377 for use in subsequent iterations through data detector circuit 325. Data detector circuit 325 may be any data detector circuit known in the art. For example, in some embodiments of the present invention, data detector circuit 325 is a Viterbi algorithm data detector circuit. In other embodiments of the present invention, data detector circuit 325 is a maximum a posteriori data detector circuit. Based upon the disclosure provided herein, one of ordinary skill in the art will recognize a variety of data detector circuits that may be used in relation to different embodiments of the present invention. Data detector circuit 325 applies the data detection algorithm to the received data and provides a corresponding detected output 327 within a defined number of clock cycles. Detected output 327 is stored to a central queue memory circuit 360 where it awaits processing by a data decoder circuit 350.

When data decoder circuit 350 is free, a detected output 362 previously stored to central queue memory circuit 360 is accessed and a data decode algorithm is applied thereto. Data decoder circuit 350 may be any data decoder circuit known in the art including, but not limited to, a low density parity check data decoder circuit. Based upon the disclosure provided herein, one of ordinary skill in the art will recognize a variety of data decoder circuits that may be used in relation to different embodiments of the present invention. Data decoder circuit 350 applies the data decode algorithm to the received data and provides a corresponding decoded output within a defined number of clock cycles. Where the decoded output fails to converge (i.e., does not match the originally encoded data), the result of decoding is provided as a decoded output 364 to central queue memory circuit 360. Decoded output 364 is stored to a central queue memory circuit 360 where it awaits processing by a data detector circuit 325.

Once available, data detector circuit 325 accesses a decoded output 329 previously stored to central queue memory circuit 360 where it is used to guide application of the data detection algorithm to buffered output 377 to yield a detected output. This process of passing information between data detector circuit 325 and data decoder circuit 350 continues until the codeword converges or until a timeout condition occurs indicating that the codeword has to be removed from the system. When either the codeword converges or the timeout condition occurs, the result of data decoder circuit is provided as a data output 395.

The operation of data detector circuit 325 and/or data decoder circuit 350 is enabled and disabled by a power based gating circuit 380 that operates to spread power usage of data processing circuit 300. Power based gating circuit 380 receives a maximal power level 392 supportable by power regulator circuit 390 that indicates an maximum average power that may be supplied over a defined period 393. In some cases, maximal power level 392 is user programmable. Defined period 393 may be user programmable, or may be fixed. Defined period 393 corresponds to the capacitance of voltage regulator circuit 390 operable to maintain a voltage level of data processing circuit 300 operating at an expected level of ongoing activity (e.g., processing by data detector circuit 325, data decoder circuit 350, and/or central queue memory circuit 360). In one particular case, power based gating circuit 380 calculates an expected power usage based upon operational status of data detector circuit 325, central queue memory 360, and data decoder circuit 350. The expected power usage corresponds to the power used by data detector circuit 325, data decoder circuit 350, and central queue memory circuit 360 when they are operating multiplied by a number of processing periods, plus zero times all intervening delay periods, and divided by defined period 393.

As the operation of data processing circuit 300 includes operating data detector circuit 325, data decoder circuit 350, and central queue memory circuit 360 synchronized to each other. Thus, a reasonable prediction of the expected power usage may be made based upon the operational status of one of data detector circuit 325 or data decoder circuit 350. The following pseudocode provides one example of calculation of the expected power usage:

```
/* Calculate Expected Power Usage Over Defined Period 393 */
i = 0; /*Initialize Variable*/
Expected Power Usage = 0; /*Initialize Variable*/
/*Calculate Power Usage During Initial Period */
/* followed by Subsequent Full Period Predicted Operating Times*/
/* followed by Subsequent Partial Period Operating Times*/
If(Data detector circuit = Processing at Time i)
{
    /* Initial Period */
    Expected Power Usage += Remaining Processing Time of Detector * Power per Clock;
    i += Remaining Processing Time of Detector;
    /* Power for Expected Delay Time */
    Repeat Until Done
    {
            If (((Defined Period 393 – i) >= Expected Delay Time)
            {
                    Expected Power Usage += Expected Delay Time * 0;
                    i += Expected Delay Time;
            }
            /* Power for Full Detector Processing Period */
            If(((Defined Period 393 – i) >= Full Processing Time of Detector)
            {
                Expected Power Usage += Full Processing Time of Detector * Power per Clock;
                i += Full Processing Time of Detector;
            }
            /* End of Full Periods? */
            If (((Defined Period 393 – i) >= Expected Delay Time)
            {
                    Done;
            }
    }
    /* Initial Period */
    Expected Power Usage += Residual Processing Time of Detector * Power per Clock;
}
}
```

Power based gating circuit 380 compares the expected power usage against maximal power level 392. Where the expected power usage is less than maximal power level 392, power based gating circuit 380 de-asserts both a disable output 382 to data detector circuit 325 and a disable output 384 to data decoder circuit 350. As such, both data detector circuit 325 and data decoder circuit 350 operate without insertion of any additional delay periods. Alternatively, where the expected power usage is greater than maximal power level 392, power based gating circuit 380 calculates an additional delay period to be inserted between full operational periods of data detector circuit 325 or data decoder circuit 350 in accordance with the following equation:

Next Delay Period=Expected Delay Period+Additional Delay Period.

At the end of the currently executing processing period of data detector circuit 325, disable output 382 is asserted for a period corresponding to the previously calculated next delay period. Once the next delay period has passed, disable output 382 is de-asserted, and processing of data detector circuit 325 restarts. By doing this, the power usage is spread over a larger period of time. Alternatively, at the end of the currently executing processing period of data decoder circuit 350, disable output 384 is asserted for a period corresponding to the previously calculated next delay period. Once the next delay period has passed, disable output 384 is de-asserted, and processing of data decoder circuit 350 restarts. Similarly, by doing this, the power usage is spread over a larger period of time.

In other embodiments, rather than providing maximal power level 392, a minimum aggregate delay time between processing bursts is programmed and provided by power regulator circuit 390 to power based gating circuit 380. Using this, power based gating circuit 380 calculates the amount of expected delay across defined period 393. Where the expected delay is greater than the minimum aggregate delay time, power based gating circuit 380 de-asserts both a disable output 382 to data detector circuit 325 and a disable output 384 to data decoder circuit 350. As such, both data detector circuit 325 and data decoder circuit 350 operate without insertion of any additional delay periods. Alternatively, where the expected delay is less than the minimum aggregate delay time, power based gating circuit 380 calculates an additional delay period to be inserted between full operational periods of data detector circuit 325 or data decoder circuit 350 in accordance with the following equation:

Next Delay Period=Expected Delay Period+Additional Delay Period.

At the end of the currently executing processing period of data detector circuit 325, disable output 382 is asserted for a period corresponding to the previously calculated next delay period. Once the next delay period has passed, disable output 382 is de-asserted, and processing of data detector circuit 325 restarts. By doing this, the power usage is spread over a larger period of time. Alternatively, at the end of the currently executing processing period of data decoder circuit 350, disable output 384 is asserted for a period corresponding to the previously calculated next delay period. Once the next delay period has passed, disable output 384 is de-asserted, and processing of data decoder circuit 350 restarts. Similarly, by doing this, the power usage is spread over a larger period of time.

It should be noted that the aforementioned pseudocode and discussion is merely an example implementation and that many other implementations are possible in accordance with different embodiments of the present invention. For example, in another embodiment of the present invention, the additional delay (i.e., the delay in addition to the expected delay between processing periods) is only calculated when data detector circuit 325 is close to finishing processing. At this juncture it is determined whether the expected delay between processing instances of data detector circuit 325 is sufficient to maintain the circuit within the desired power parameters. Where the expected delay is not sufficient, an additional delay is calculated some time before data detector circuit 325 begins processing its subsequent data set such that the additional delay assures that the power usage over two distinct processing periods of data detector circuit 325 are below maximal power level 392. The first distinct period covers the power usage of data detector circuit 325 over defined period 393 ending before data detector circuit 325 begins processing its subsequent data set. The second distinct period covers the power usage of data detector circuit 325 over defined period 393 ending at or shortly before the conclusion of data detector circuit 325 processing its subsequent data set. Where either of these power usage values exceeds maximal power level 392, an additional delay is inserted between the current processing period of data detector circuit 325 and the subsequent processing period of data detector circuit 325. Based upon the disclosure provided herein, one of ordinary skill in the art will recognize other approaches for calculating additional delay to be inserted between successive processing periods of data detector circuit 325 and/or data decoder circuit 350 to govern power usage.

Figure 4A:
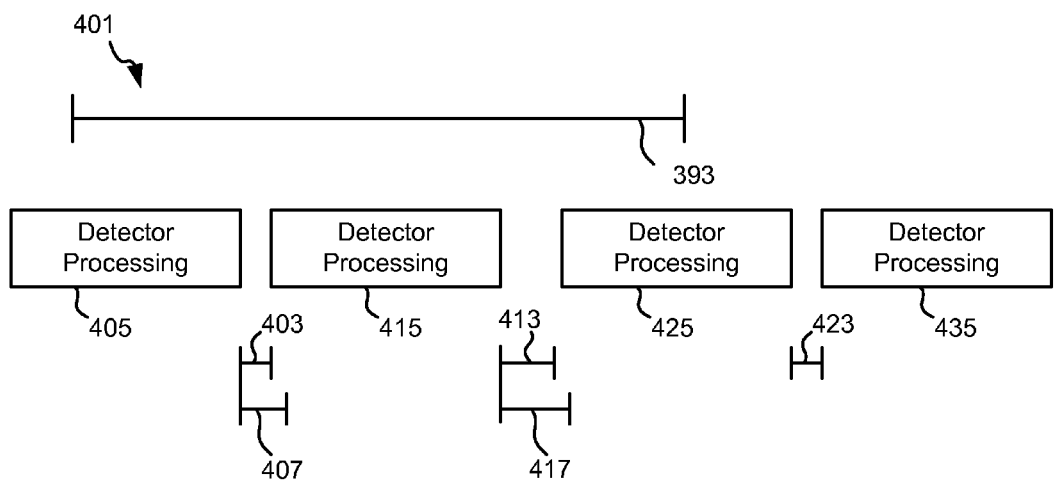
FIG. 4a and FIG. 4b graphically depict an example of the before and after effects of the power usage spreading circuitry of the data processing circuit of FIG. 3.
Figure 4B:
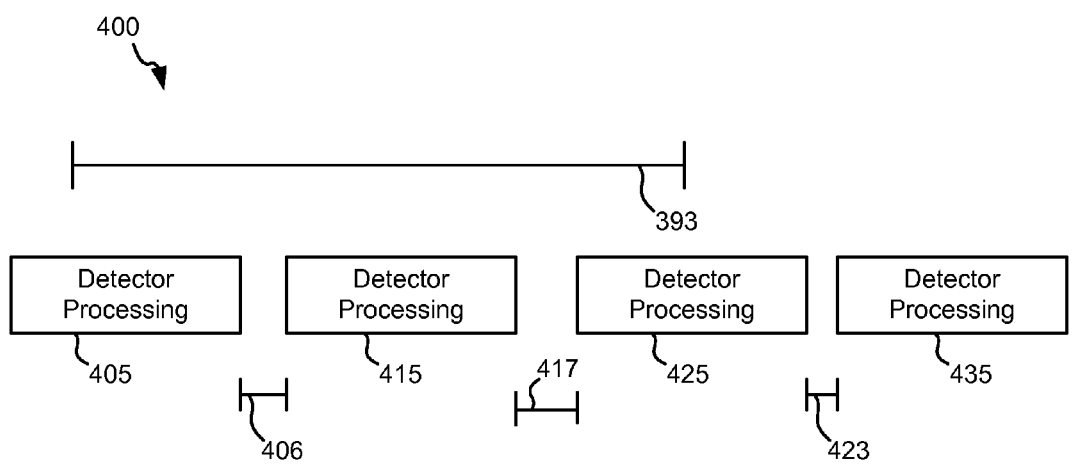

Turning to FIG. 4a and FIG. 4b, a time line 400, 401 of the operation of power based gating circuit 380 relative to the processing of data detector circuit 325 is shown. Of note, the process depicted in FIG. 4a applies a disable only to data detector circuit 325 using disable output 382. It should be recognized that a similar power spreading may be accomplished by asserting disable output 384 to data decoder circuit 350 or by asserting a combination of disable output 382 and disable output 384. Because of the lock step processing approach of data processing circuit 300 where data decoder circuit 350 relies on data detector circuit 325 to fill central queue memory 360 and vice versa, temporarily disabling one or either data detector circuit 325 and data decoder circuit 350 causes a processing delay that affects both processors. This delay spreads power usage bringing current consumption to a level that can be supported by power regulator circuit 390.

Turning specifically to FIG. 4a, a timeline 401 shows an instance of defined period 393 in relation to a number of expected detector processing periods 405, 415, 425, 435, and intervening expected delay periods 403, 413, 423. As discussed above, defined period 393 substantially exceeds the defined number of clock cycles corresponding to one detector processing period. In some cases, defined period 393 may exceed the defined number of clock cycles corresponding to two successive detector processing periods plus the intervening expected delay. In yet other case, defined period 393 may exceed the defined number of clock cycles corresponding to three or more successive detector processing periods plus the intervening expected delays. As defined period 393 substantially exceeds the defined number of clock cycles required by a data detector circuit, modifying the power level during the defined period may be done by modifying the delay period between operations of the data detector circuit and/or the data decoder circuit. In operation, consistent with one of the approaches discussed above in relation for FIG. 3, power based gating circuit 380 determines that the next delay should be that shown as extended period 417. As shown in FIG. 4b, a timeline 400 shows the effects of power based gating circuit 380 asserting disable output 382 at the end of detector processing period 415, and maintaining it for the period corresponding to extended delay 417. At this juncture, power based gating circuit 380 de-asserts disable output 382 to allow data detector circuit 325 to begin processing a next codeword during a detector processing period 415. Again, it should be noted that timelines 400, 401 depict only the disabling of data detector circuit 325, but could have shown delaying operation of data decoder circuit 350.

Figure 5:
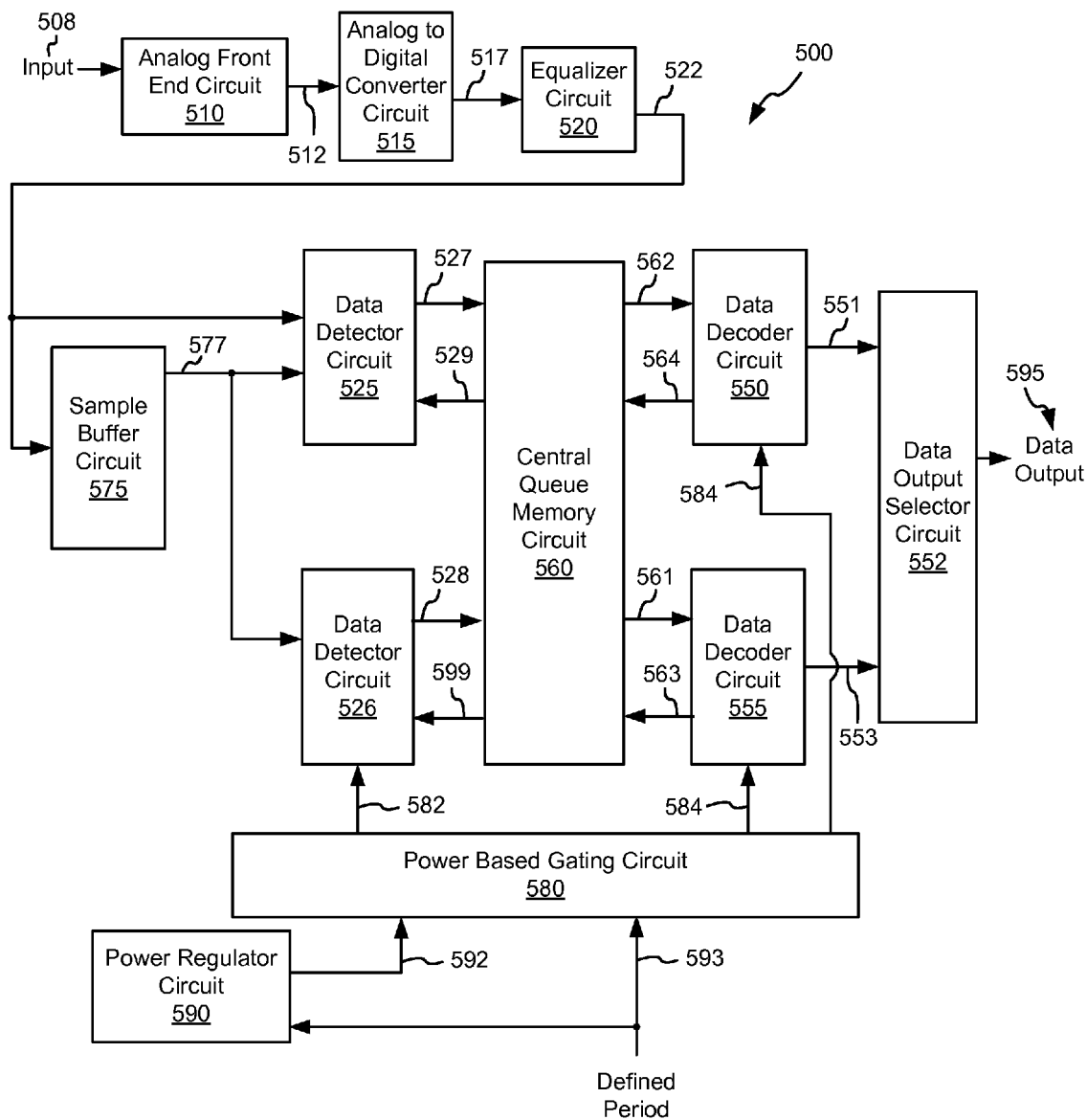
FIG. 5 depicts another data processing circuit having power usage spreading circuitry in accordance with various embodiments of the present invention.

Turning to FIG. 5, another data processing circuit 500 having power usage spreading circuitry is shown in accordance with various embodiments of the present invention. Data processing circuit 500 includes an analog front end circuit 510 that receives an analog signal 508. Analog front end circuit 510 processes analog signal 508 and provides a processed analog signal 512 to an analog to digital converter circuit 515. Analog front end circuit 510 may include, but is not limited to, an analog filter and an amplifier circuit as are known in the art. Based upon the disclosure provided herein, one of ordinary skill in the art will recognize a variety of circuitry that may be included as part of analog front end circuit 510. In some cases, analog signal 508 is derived from a read/write head assembly (not shown) that is disposed in relation to a storage medium (not shown). In other cases, analog signal 508 is derived from a receiver circuit (not shown) that is operable to receive a signal from a transmission medium (not shown). The transmission medium may be wired or wireless. Based upon the disclosure provided herein, one of ordinary skill in the art will recognize a variety of source from which analog input 508 may be derived.

Analog to digital converter circuit 515 converts processed analog signal 512 into a corresponding series of digital samples 517. Analog to digital converter circuit 515 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 517 are provided to an equalizer circuit 520. Equalizer circuit 520 applies an equalization algorithm to digital samples 517 to yield an equalized output 522. In some embodiments of the present invention, equalizer circuit 520 is a digital finite impulse response filter circuit as are known in the art.

Equalized output 522 is provided to both a data detector circuit 525 and to a sample buffer circuit 575. Sample buffer circuit 575 stores equalized output 522 as buffered data 577 for use in subsequent iterations through data detector circuit 525. Data detector circuit 525 may be any data detector circuit known in the art. For example, in some embodiments of the present invention, data detector circuit 525 is a Viterbi algorithm data detector circuit. In other embodiments of the present invention, data detector circuit 525 is a maximum a posteriori data detector circuit. Based upon the disclosure provided herein, one of ordinary skill in the art will recognize a variety of data detector circuits that may be used in relation to different embodiments of the present invention. Data detector circuit 525 applies the data detection algorithm to the received data and provides a corresponding detected output 527 within a defined number of clock cycles. Detected output 527 is stored to a central queue memory circuit 360 where it awaits processing by one of a data decoder circuit 550 or a data decoder circuit 555.

Data decoder circuit 550 and data decoder circuit 555 operate in parallel each one accepting the next detected output available from central queue memory circuit 560. When one of data decoder circuit 550 or data decoder circuit 555 is free, a detected output that was previously stored to central queue memory circuit 360 is accessed and a data decode algorithm is applied thereto. Where data decoder circuit 550 is free, detected output 562 provides the data, and where data decoder circuit 555 is free, detected output 562 provides the data. Data decoder circuits 550, 555 may be any data decoder circuits known in the art including, but not limited to, a low density parity check data decoder circuit. Based upon the disclosure provided herein, one of ordinary skill in the art will recognize a variety of data decoder circuits that may be used in relation to different embodiments of the present invention. The data decoder circuit applies the data decode algorithm to the received data and provides a corresponding decoded output within a defined number of clock cycles. Where the decoded output fails to converge (i.e., does not match the originally encoded data), the result of decoding is provided as a decoded output 564 to central queue memory circuit 560. Decoded output 564 is stored to a central queue memory circuit 560 where it awaits processing by one of data detector circuit 325 or a data detector circuit 526. Data detector circuit 526 is similar to data detector circuit 525, and operates in parallel thereto.

Once one of data detector circuit 525 or data detector circuit 526 becomes available, the available data detector circuit accesses a decoded output previously stored to central queue memory circuit 560 where it is used to guide application of the data detection algorithm to buffered output 577 to yield a detected output. This process of passing information between data detector circuits 525, 526 and data decoder circuits 550, 555 continues until the codeword converges or until a timeout condition occurs indicating that the codeword has to be removed from the system. When either the codeword converges or the timeout condition occurs, the result of data decoder circuit is provided as a data output 551 or data output 553 depending upon which data decoder circuit completed the processing. A data output selector circuit 552 selects the active one of data output 551 or data output 553 to be provides as a data output 595.

The operation of data detector circuit 526 and/or data decoder circuit 555 is enabled and disabled by a power based gating circuit 580 that operates to spread power usage of data processing circuit 500. Power based gating circuit 580 receives a maximal power level 592 supportable by power regulator circuit 590 that indicates an maximum average power that may be supplied over a defined period 593. In some cases, maximal power level 592 is user programmable. Defined period 593 may be user programmable, or may be fixed. Defined period 593 corresponds to the capacitance of voltage regulator circuit 590 operable to maintain a voltage level of data processing circuit 500 operating at an expected level of ongoing activity (e.g., processing by data detector circuits 525, 526, data decoder circuits 550, 555. In one particular case, power based gating circuit 580 calculates an expected power usage based upon operational status of data detector circuit 526 and/or data decoder circuit 555. The expected power usage corresponds to the power used by data detector circuits 525, 526; data decoder circuits 550, 555; and central queue memory circuit 560 when they are operating multiplied by a number of processing periods, plus zero times all intervening delay periods, and divided by defined period 593.

As the operation of data processing circuit 500 includes operating data detector circuits 525, 526, data decoder circuits 550, 555, and central queue memory circuit 560 synchronized to each other. Thus, a reasonable prediction of the expected power usage may be made based upon the operational status of one of data detector circuit 526 or data decoder circuit 555. The following pseudocode provides one example of calculation of the expected power usage:

```
/* Calculate Expected Power Usage Over Defined Period 593 */
i = 0; /*Initialize Variable*/
Expected Power Usage = 0; /*Initialize Variable*/
/*Calculate Power Usage During Initial Period */
/* followed by Subsequent Full Period Predicted Operating Times*/
/* followed by Subsequent Partial Period Operating Times*/
If(Data detector circuit = Processing at Time i)
{
    /* Initial Period */
    Expected Power Usage += Remaining Processing Time of Detector * Power per Clock;
    i += Remaining Processing Time of Detector;
    /* Power for Expected Delay Time */
    Repeat Until Done
    {
        If ((((Defined Period 593 – i) >= Expected Delay Time)
        {
            Expected Power Usage += Expected Delay Time * 0;
            i += Expected Delay Time;
        }
        /* Power for Full Detector Processing Period */
        If(((Defined Period 593 – i) >= Full Processing Time of Detector)
        {
            Expected Power Usage += Full Processing Time of Detector * Power per Clock;
            i += Full Processing Time of Detector;
        }
        /* End of Full Periods? */
        If ((((Defined Period 593 – i) >= Expected Delay Time)
        {
            Done;
        }
    }
    /* Initial Period */
    Expected Power Usage += Residual Processing Time of Detector * Power per Clock;
}
}
```

Power based gating circuit 580 compares the expected power usage against maximal power level 592. Where the expected power usage is less than maximal power level 592, power based gating circuit 580 de-asserts both a disable output 582 to data detector circuit 525 and a disable output 584 to data decoder circuit 550. As such, both data detector circuit 526 and data decoder circuit 550 operate without insertion of any additional delay periods. Alternatively, where the expected power usage is greater than maximal power level 592, power based gating circuit 580 calculates an additional delay period to be inserted between full operational periods of data detector circuit 526 or data decoder circuit 555 in accordance with the following equation:

Next Delay Period=Expected Delay Period+Additional Delay Period.

At the end of the currently executing processing period of data detector circuit 526, disable output 582 is asserted for a period corresponding to the previously calculated next delay period. Once the next delay period has passed, disable output 582 is de-asserted, and processing of data detector circuit 526 restarts. By doing this, the power usage is spread over a larger period of time. Alternatively, at the end of the currently executing processing period of data decoder circuit 555, disable output 584 is asserted for a period corresponding to the previously calculated next delay period. Once the next delay period has passed, disable output 584 is de-asserted, and processing of data decoder circuit 555 restarts. Similarly, by doing this, the power usage is spread over a larger period of time.

In other embodiments, rather than providing maximal power level 592, a minimum aggregate delay time between processing bursts is programmed and provided by power regulator circuit 590 to power based gating circuit 580. Using this, power based gating circuit 580 calculates the amount of expected delay across defined period 593. Where the expected delay is greater than the minimum aggregate delay time, power based gating circuit 580 de-asserts both a disable output 582 to data detector circuit 526 and a disable output 584 to data decoder circuit 555. As such, both data detector circuit 526 and data decoder circuit 555 operate without insertion of any additional delay periods. Alternatively, where the expected delay is less than the minimum aggregate delay time, power based gating circuit 580 calculates an additional delay period to be inserted between full operational periods of data detector circuit 526 or data decoder circuit 555 in accordance with the following equation:

Next Delay Period=Expected Delay Period+Additional Delay Period.

At the end of the currently executing processing period of data detector circuit 526, disable output 582 is asserted for a period corresponding to the previously calculated next delay period. Once the next delay period has passed, disable output 582 is de-asserted, and processing of data detector circuit 526 restarts. By doing this, the power usage is spread over a larger period of time. Alternatively, at the end of the currently executing processing period of data decoder circuit 555, disable output 584 is asserted for a period corresponding to the previously calculated next delay period. Once the next delay period has passed, disable output 584 is de-asserted, and processing of data decoder circuit 555 restarts. Similarly, by doing this, the power usage is spread over a larger period of time.

It should be noted that the aforementioned pseudocode and discussion is merely an example implementation and that many other implementations are possible in accordance with different embodiments of the present invention. For example, in another embodiment of the present invention, the additional delay (i.e., the delay in addition to the expected delay between processing periods) is only calculated when data decoder circuit 555 is close to finishing processing. At this juncture it is determined whether the expected delay between processing instances of data decoder circuit 555 is sufficient to maintain the circuit within the desired power parameters. Where the expected delay is not sufficient, an additional delay is calculated some time before data decoder circuit 555 begins processing its subsequent data set such that the additional delay assures that the power usage over two distinct processing periods of data decoder circuit 555 are below maximal power level 592. The first distinct period covers the power usage of data decoder circuit 555 over defined period 593 ending before data decoder circuit 555 begins processing its subsequent data set. The second distinct period covers the power usage of data decoder circuit 555 over defined period 593 ending at or shortly before the conclusion of data decoder circuit 555 processing its subsequent data set. Where either of these power usage values exceeds maximal power level 592, an additional delay is inserted between the current processing period of data detector circuit 555 and the subsequent processing period of data decoder circuit 555. Based upon the disclosure provided herein, one of ordinary skill in the art will recognize other approaches for calculating additional delay to be inserted between successive processing periods of data decoder circuit 555 and/or data detector circuit 526 to govern power usage.

Figure 6A:
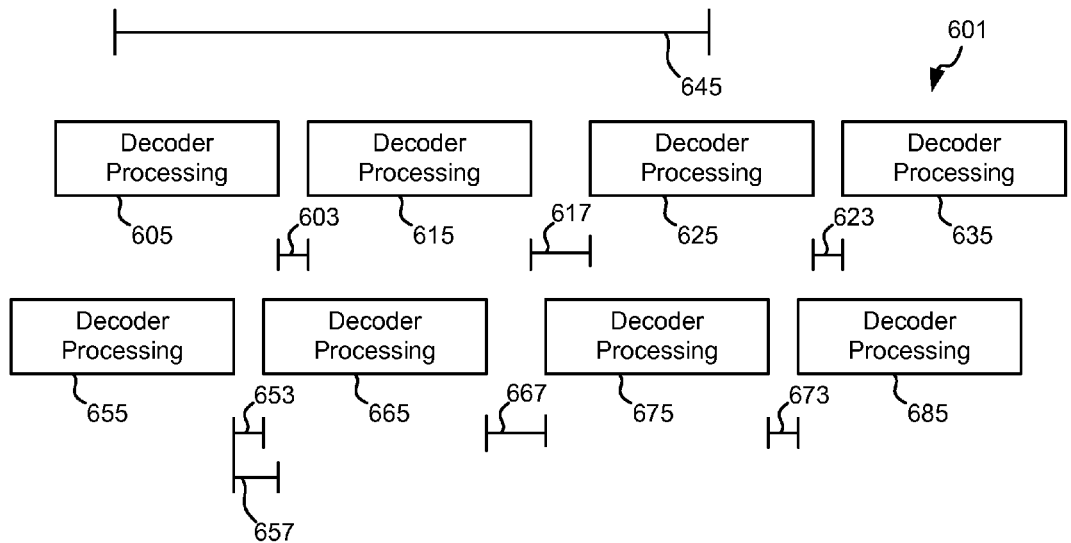
FIG. 6a and FIG. 6b graphically depict an example of the before and after effects of the power usage spreading circuitry of the data processing circuit of FIG. 5.
Figure 6B:
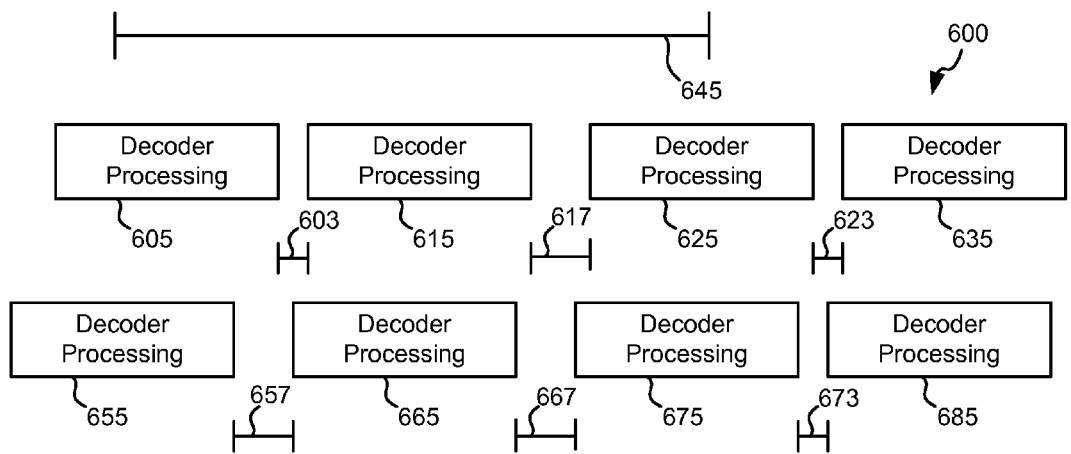

Turning to FIG. 6*a* and FIG. 6*b*, a time line 600, 601 of the operation of power based gating circuit 580 relative to the processing of data decoder circuit 555 is shown. Of note, the process depicted in FIG. 6*a* applies a disable output only to data decoder circuit 555 (i.e., asserting disable output 584). It should be recognized that a similar power spreading may be accomplished by asserting disable output 582 to data detector circuit 526 or by asserting a combination of disable output 582 and disable output 584. Because of the lock step processing approach of data processing circuit 500 where data decoder circuit 555 relies on data detector circuits 525, 526 to fill central queue memory 560 and vice versa, temporarily disabling one or either data detector circuit 526 and data decoder circuit 555 causes a processing delay that affects both processors. This delay spreads power usage bringing current consumption to a level that can be supported by power regulator circuit 590.

Turning specifically to FIG. 6*a*, a timeline 601 shows an instance of defined period 593 in relation to a number of expected decoder processing periods 605, 615, 625, 635 corresponding to data decoder circuit 550; decoder processing periods 655, 665, 675, 685 corresponding to data decoder circuit 555; and intervening expected delay periods 603, 617, 623, 653, 667 and 673. As discussed above, defined period 593 substantially exceeds the defined number of clock cycles corresponding to one decoder processing period. In some cases, defined period 593 may exceed the defined number of clock cycles corresponding to two successive decoder processing periods plus the intervening expected delay. In yet other case, defined period 593 may exceed the defined number of clock cycles corresponding to three or more successive decoder processing periods plus the intervening expected delays. As defined period 593 substantially exceeds the defined number of clock cycles required by a data decoder circuit, modifying the power level during the defined period may be done by modifying the delay period between operations of the data decoder circuit and/or the data detector circuit. In operation, consistent with one of the approaches discussed above in relation for FIG. 5, power based gating circuit 580 determines that the next delay should be that shown as extended period 657. As shown in FIG. 6b, a timeline 600 shows the effects of power based gating circuit 580 asserting disable output 584 at the end of decoder processing period 655, and maintaining it for the period corresponding to extended delay 657. At this juncture, power based gating circuit 580 de-asserts disable output 584 to allow data decoder circuit 555 to begin processing a next codeword during a decoder processing period 665. Again, it should be noted that timelines 600, 601 depict only the disabling of data decoder circuit 555, but could have shown delaying operation of data detector circuit 526.

Figure 7:
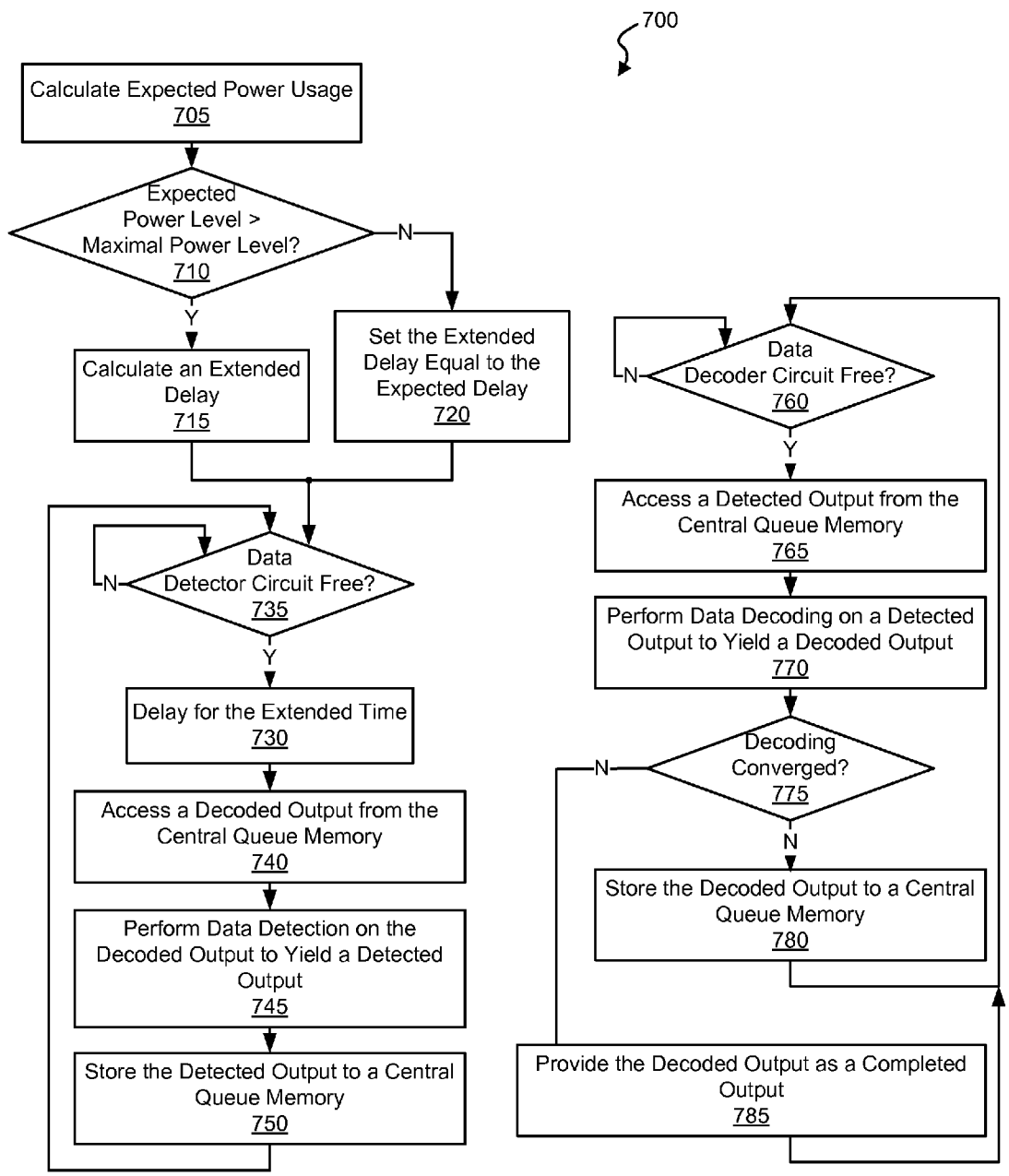
FIG. 7 is a flow diagram showing a method in accordance with one or more embodiments of the present invention for power usage spreading in an iterative data decoding circuit.

Turning to FIG. 7, a flow diagram 700 shows a method in accordance with one or more embodiments of the present invention for power usage spreading in an iterative data decoding circuit. Following flow diagram 700, an expected power level for a data processing circuit is calculated (block 705). This expected power usage includes an amount of power expected to be used over a defined period. The defined period may correspond to the capacitance of a voltage regulator circuit supporting the data processing circuit as it correlates to a period over which a desired voltage level can be supported when data processing circuit is operating at an expected level of ongoing activity (e.g., processing by one or more a data detector circuits, data decoder circuits, and/or a central queue memory circuit including intervening expected delay periods between processor operations). The defined period substantially exceeds the defined number of clock cycles required by a data detector circuit plus an expected delay between successive operative periods of the data detector circuit. As such, modifying the power level during the defined period may be done by modifying the delay period between operations of the data detector circuit and/or the data decoder circuit.

It is determined whether the expected power level is greater than a maximal power level (block 710). The maximal power level corresponds to a power level supportable over the defined period and may be user programmable. Where the expected power level does not exceed the maximal power level (block 710), the extended delay is set equal to the expected delay (block 720). As such, processing continues with the natural delay that would be expected between successive operations of the data detector circuit and/or the data decoder circuit as there is sufficient power available to support the expected operation. In contrast, when the expected power level exceeds the maximal power level (block 710), an extended delay is calculated that is greater than the expected delay and sufficient to make the proposed power level less than the maximal power level (block 715). As such, power usage by the circuit is brought within the constraints imposed by the programmed maximal power level by adjusting the amount of delay between successive operations of the data detector circuit as there is sufficient power available to support the expected operation, and without interfering with the operable period of the data detector circuit.

It is then determined whether the data detector circuit (or one of a number of data detector circuits) is free (block 735). Where the data detector circuit is free (block 735), the extended delay period (i.e., the delay period calculated in either block 715 or block 720) is enforced (block 730). Once the delay period has passed (block 730), a decoded output is accessed from the central queue memory (block 740). A data detection is performed on the next available decoded output from a central queue memory to yield a detected output (block 745), and the detected output is stored back to the central queue memory (block 750). Of note, once the data detection process begins, it proceeds without consideration of power limitations. The power limitations are considered in the calculated or expected delay periods (blocks 715, 720).

In parallel, it is determined whether the data decoder circuit is free (block 760). Where the data decoder circuit is free (block 760), a detected output is accessed from the central queue memory (block 765). A data decoding is performed on the detected output to yield a decoded output (block 770). It is determined whether the data decoding converged (i.e., resulted in the originally written data)(block 775). Where the decoding did not converge (block 775), the decoded output is stored to the central queue memory for additional processing (block 780). Otherwise, the decoded output is provided as a data output (block 785).

It should be noted that flow diagram 700 provides an example of modifying an expected delay between successive operations of a data detector circuit to govern power usage in a data processing circuit, but that a similar result may be achieved by modifying an expected delay between successive operations of a data decoder circuit. In such a case, a delay would be calculated and enforced before block 780, and the defined period substantially exceeds the defined number of clock cycles required by a data decoder circuit plus an expected delay between successive operative periods of the data decoder circuit.

Further, it should be noted that a proxy of the expected power usage (block 705) may be used. For example, an expected delay time between successive operations of the data detector circuit and/or data decoder circuit over the defined period may be calculated. As the processing time and corresponding power usage of the data detector circuit and/or data decoder circuit is reasonably fixed, knowing the delay time between successive processing operations is a reasonable proxy of the power usage. With this, the calculated delay time may be compared with a threshold delay time corresponding to the maximal power level (block 710). Either the expected power level or a proxy thereof are generically referred to herein as "an expected operational level". Either the maximal power level or a proxy thereof are generically referred to herein as "a supportable operational level".

It should be noted that the various blocks discussed in the above application may be implemented in integrated circuits along with other functionality. Such integrated circuits may include all of the functions of a given block, system or circuit, or only a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for data processing. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data processing system, the data processing system comprising:
   a data detector circuit operable to apply a data detection algorithm guided by a first decoded output to a first data set to yield a first detected output and to apply the data detection algorithm guided by a second decoded output to a second data set to yield a second detected output;
   a data decoder circuit operable to apply a data decode algorithm to the first detected output to yield the first decoded output and to apply the data decode algorithm to the second detected output to yield the second decoded output;
   a gating circuit including a period input and operable to receive a period value at the period input, and to spread a power usage level by delaying at least one of:
      the start of applying the data detection algorithm to the first data set by the data detector circuit based at least in part on the period value;
      the start of applying the data decode algorithm to the first detected output by the data decoder circuit based at least in part on the period value; and
      wherein the period value corresponds to a capacitance of a voltage regulator circuit.

2. The data processing system of claim 1, wherein once applying the data detection algorithm to the first data set by the data detector circuit begins, application of the data detection algorithm to the first data set continues to completion without delay by the gating circuit.

3. The data processing system of claim 1, wherein once applying the data decode algorithm to the first detected output by the data decoder circuit begins, application of the data decode algorithm to the first detected output continues to completion without delay by the gating circuit.

4. The data processing system of claim 1, wherein the data decode algorithm is selected from a group consisting of: a Reed Solomon data decode algorithm, and a low density parity check decode algorithm.

5. The data processing system of claim 1, wherein the data detection algorithm is selected from a group consisting of: a maximum a posteriori data detection algorithm, and a Viterbi algorithm data detector circuit.

6. The data processing system of claim 1, wherein the data processing system is implemented as part of a device selected from a group consisting of: a storage device and a receiving device.

7. The data processing system of claim 1, wherein the data processing system is implemented as part of an integrated circuit.

8. The data processing system of claim 1, wherein the gating circuit is operable to assert a disable signal to the data detector circuit between application of the data detection algorithm to the first decoded output and application of the data detection algorithm to the second decoded output.

9. The data processing system of claim 1, wherein the gating circuit is operable to assert a disable signal to the data decoder circuit between application of the data decode algorithm to the first detected output and application of the data decode algorithm to the second detected output.

10. The data processing system of claim 1, wherein the gating circuit is operable to calculate an extended delay period between application of the data decode algorithm to the first detected output and application of the data decode algorithm to the second detected output based at least upon a first expected power usage corresponding to the data decoder circuit applying the data decode algorithm to the first detected output, a second expected power usage corresponding to the data decoder circuit applying the data decode algorithm to the second detected output, and an expected delay between application of the data decode algorithm to the first detected output and application of the data decode algorithm to the second detected output.

11. The data processing system of claim 1, wherein the gating circuit is operable to calculate an extended delay period between application of the data detection algorithm to the first decoded output and application of the data detection algorithm to the second decoded output based at least upon a first expected power usage corresponding to the data detector circuit applying the data detection algorithm to the first decoded output, a second expected power usage corresponding to the data detector circuit applying the data detection algorithm to the second decoded output, and an expected delay between application of the data detection algorithm to the first decoded output and application of the data detection algorithm to the second decoded output.

12. The data processing system of claim 1, wherein the gating circuit is operable to calculate an extended delay period between application of the data decode algorithm to the first detected output and application of the data decode algorithm to the second detected output based at least upon an expected delay between the data decoder circuit applying the data decode algorithm to the first detected output and the data decoder circuit applying the data decode algorithm to the second detected output.

13. The data processing system of claim 1, wherein the gating circuit is operable to calculate an extended delay period between application of the data detection algorithm to the first decoded output and application of the data detection algorithm to the second decoded output based at least upon an expected delay between the data detector circuit applying the data detection algorithm to the first detected output and the data decoder circuit applying the data decode algorithm to the second detected output.

14. A method for governing power usage in a data processing system, the method comprising:
   calculating an expected operational level;
   receiving a supportable operational level, wherein the supportable operational level is based at least in part on a capacitance of a voltage regulator circuit governing power distribution to the data processing system;
   calculating a delay between processing of a first data set and a second data set by a processing circuit in the data processing system that renders the expected operational level less than or equal to the supportable operational level; and
   enforcing the delay between the processing circuit operating on the first data set and the processing circuit operating on the second data set.

15. The method of claim 14, wherein the processing circuit is a data detector circuit operable to apply a data detection algorithm to the first data set and to the second data set, and wherein the data detector circuit is selected from a group consisting of: a maximum a posteriori data detection algorithm, and a Viterbi algorithm data detector circuit.

16. The method of claim 15, wherein once applying the data detection algorithm to the second data set by the data detector circuit begins, application of the data detection algorithm to the second data set continues to completion without delay by the gating circuit.

17. The method of claim 14, wherein the processing circuit is a data decoder circuit operable to apply a data decode algorithm to the first data set and to the second data set, and wherein the data decoder circuit is selected from a group consisting of: a Reed Solomon data decode algorithm, and a low density parity check decode algorithm.

18. The method of claim 17, wherein once applying the data decode algorithm to the second data set by the data decoder circuit begins, application of the data decode algorithm to the second data set continues to completion without delay by the gating circuit.

19. A storage device, the storage device comprising:
a storage medium;
a head assembly disposed in relation to the storage medium and operable to provide a sensed signal corresponding to information on the storage medium;
a read channel circuit including:
an analog to digital converter circuit operable to sample an analog signal derived from the sensed signal to yield a series of digital samples;
an equalizer circuit operable to equalize the digital samples to yield a detector input;
a data detector circuit operable to apply a data detection algorithm guided by a first decoded output to the detector input and to apply the data detection algorithm guided by a second decoded output to a detector input to yield a second detected output;
a data decoder circuit operable to apply a data decode algorithm to the first detected output to yield the first decoded output and to apply the data decode algorithm to the second detected output to yield the second decoded output;
a gating circuit including a period input and operable to receive a period value at the period input, and to spread a power usage level by delaying at least one of:
the start of applying the data detection algorithm to the first data set by the data detector circuit based at least in part on the period value;
the start of applying the data decode algorithm to the first detected output by the data decoder circuit based at least in part on the period value; and
wherein the period value corresponds to a capacitance of a voltage regulator circuit.

20. The storage device of claim 19, wherein once applying the data detection algorithm to the first data set by the data detector circuit begins, application of the data detection algorithm to the first data set continues to completion without delay by the gating circuit.

21. The storage device of claim 19, wherein the gating circuit is operable to assert a disable signal to the data detector circuit between application of the data detection algorithm to the first decoded output and application of the data detection algorithm to the second decoded output.

22. The storage device of claim 19, wherein the gating circuit is operable to calculate an extended delay period between application of the data decode algorithm to the first detected output and application of the data decode algorithm to the second detected output based at least upon a first expected power usage corresponding to the data decoder circuit applying the data decode algorithm to the first detected output, a second expected power usage corresponding to the data decoder circuit applying the data decode algorithm to the second detected output, and an expected delay between application of the data decode algorithm to the first detected output and application of the data decode algorithm to the second detected output.

23. The storage device of claim 19, wherein the gating circuit is operable to calculate an extended delay period between application of the data detection algorithm to the first decoded output and application of the data detection algorithm to the second decoded output based at least upon an expected delay between the data detector circuit applying the data detection algorithm to the first detected output and the data decoder circuit applying the data decode algorithm to the second detected output.

24. The data processing system of claim 1, wherein the system further comprises:
the voltage regulator circuit.

* * * * *